Figure 1:
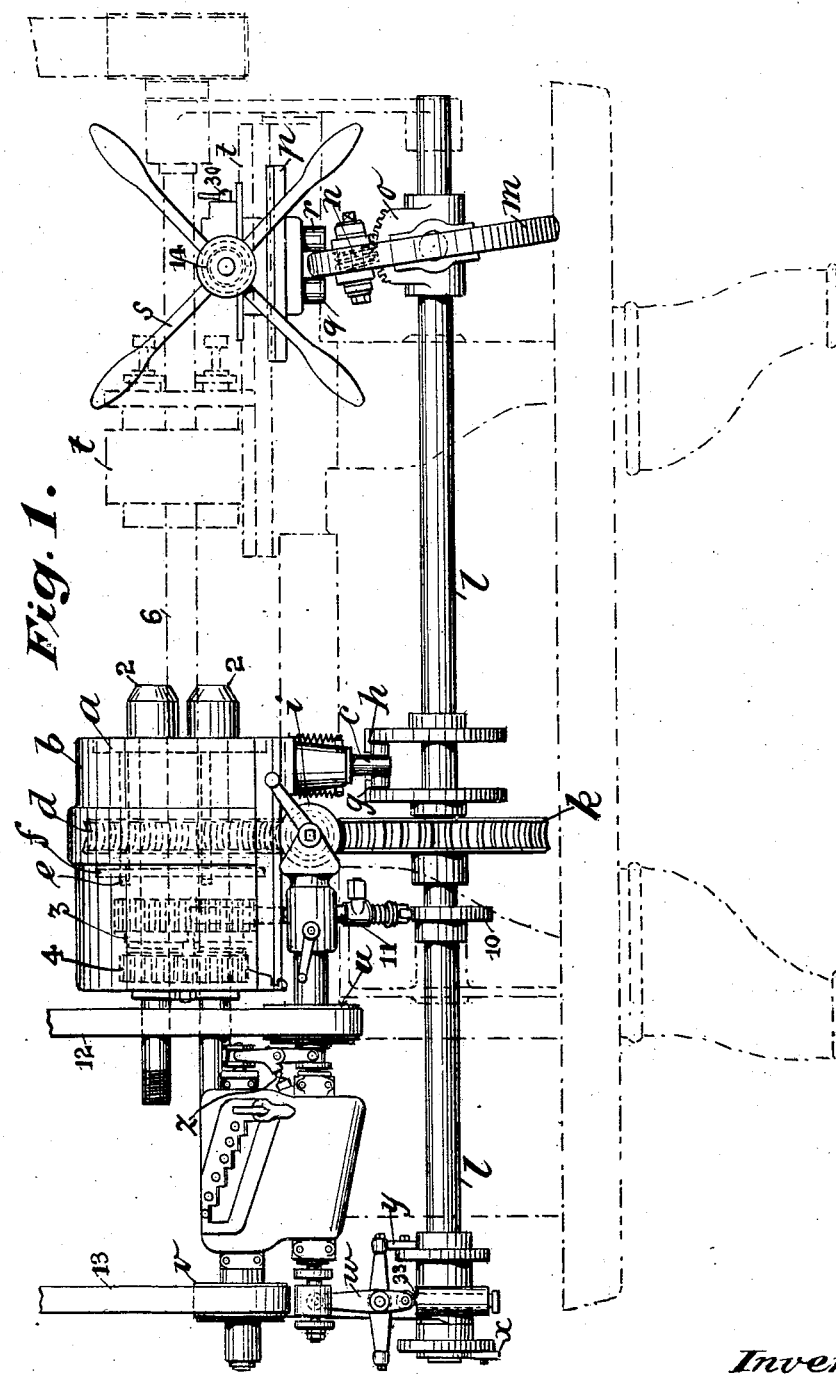

No. 859,351. PATENTED JULY 9, 1907.
H. P. TRUEMAN & E. D. CLEGHORN.
MULTIPLE SPINDLE SCREW MAKING AND METAL TURNING LATHE.
APPLICATION FILED JULY 5, 1904.

7 SHEETS—SHEET 1.

Witnesses
Alfred Bosshardt
Stanley E. Bramall

Inventors
Henry Pattman Trueman
Edward Duncan Cleghorn
Per F. B. Schardt
Attorney.

No. 859,351. PATENTED JULY 9, 1907.
H. P. TRUEMAN & E. D. CLEGHORN.
MULTIPLE SPINDLE SCREW MAKING AND METAL TURNING LATHE.
APPLICATION FILED JULY 5, 1904.

7 SHEETS—SHEET 2.

No. 859,351. PATENTED JULY 9, 1907.
H. P. TRUEMAN & E. D. CLEGHORN.
MULTIPLE SPINDLE SCREW MAKING AND METAL TURNING LATHE.
APPLICATION FILED JULY 5, 1904.
7 SHEETS—SHEET 3.
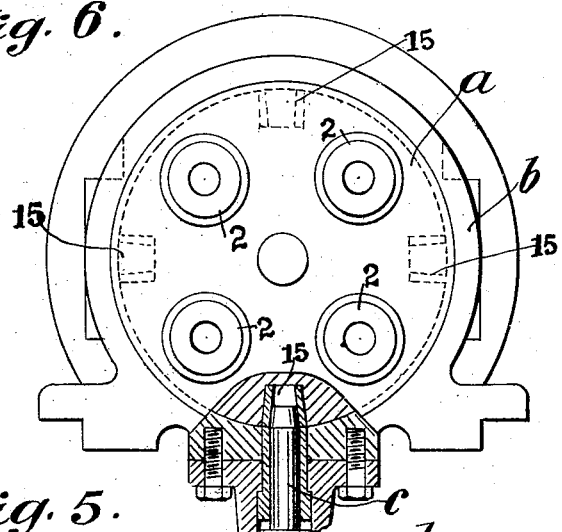
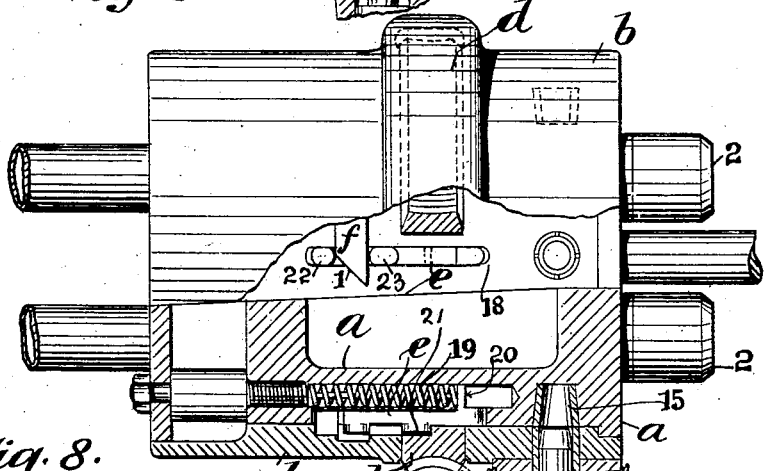
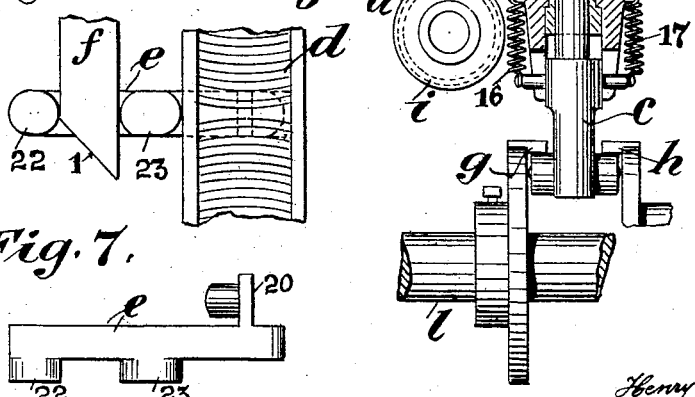
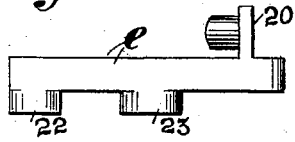
Witnesses:
Alfred Boshardt
Stanley Bramall
Inventors
Henry Pattman Trueman
Edward Duncan Cleghorn
Per F. Eckhardt
Attorney.
THE NORRIS PETERS CO., WASHINGTON, D. C.

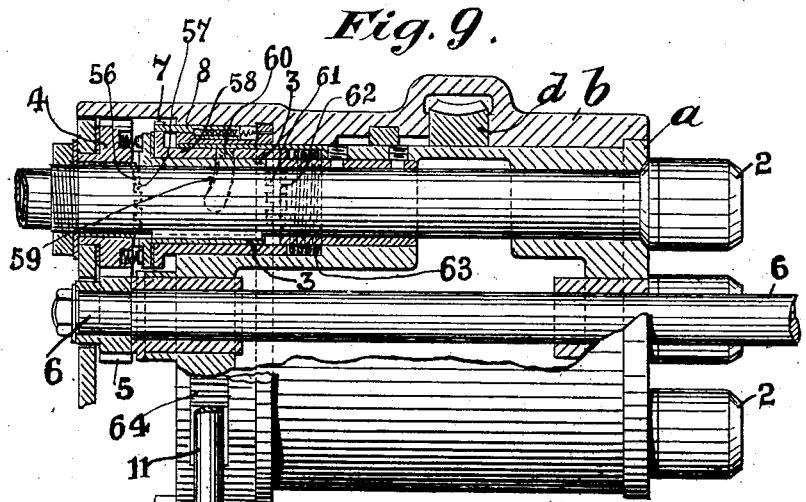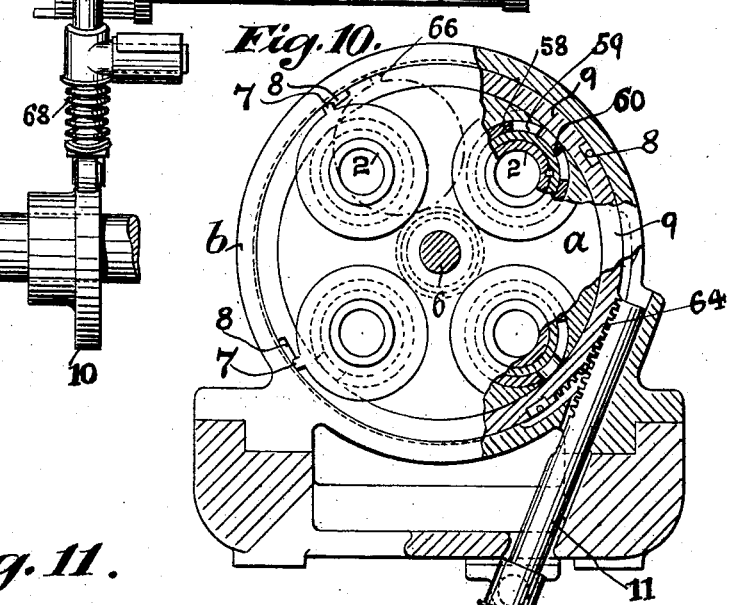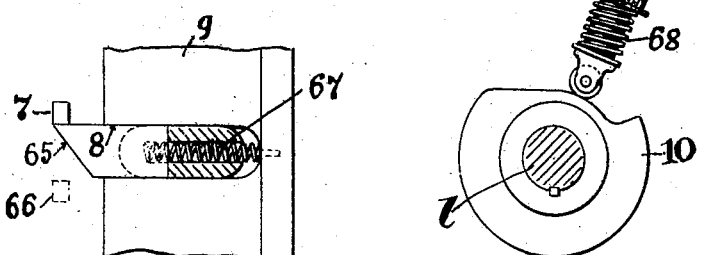

No. 859,351. PATENTED JULY 9, 1907.
H. P. TRUEMAN & E. D. CLEGHORN.
MULTIPLE SPINDLE SCREW MAKING AND METAL TURNING LATHE.
APPLICATION FILED JULY 5, 1904.
7 SHEETS—SHEET 5.
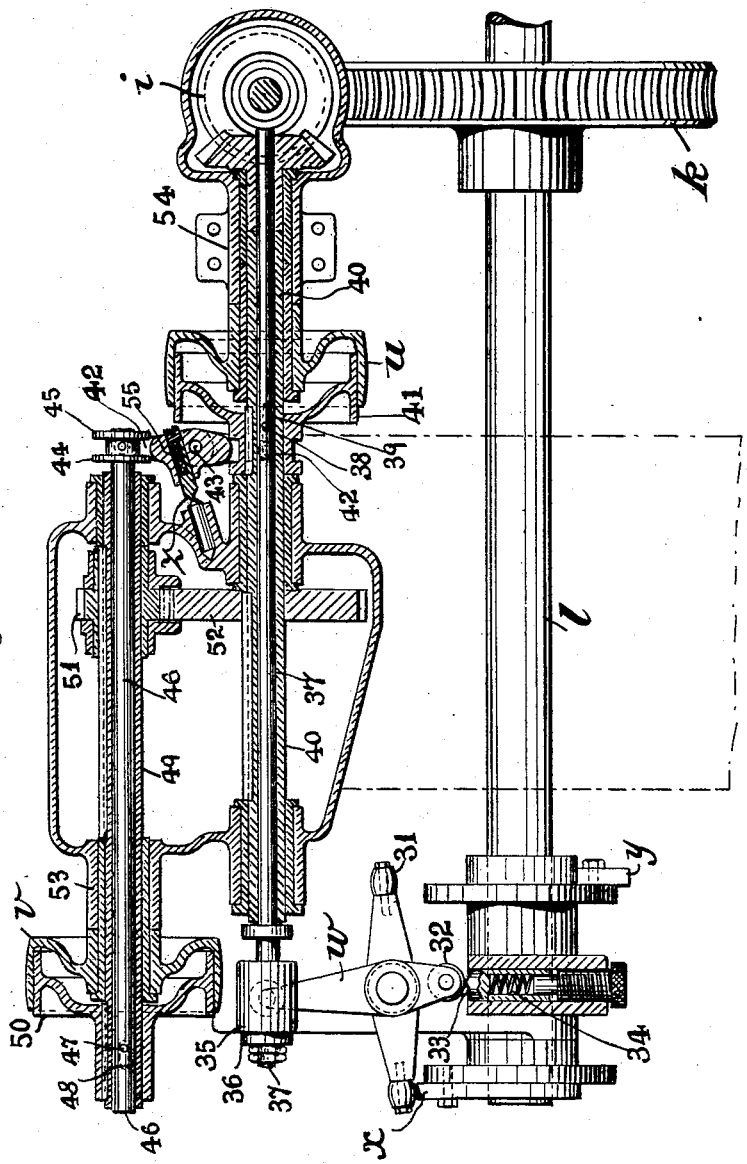
Witnesses:
Alfred Bosshardt
Stanley V Bramall
Inventors
Henry Pattman Trueman
Edward Duncan Cleghorn
Per F. Bosshardt,
Attorney.

No. 859,351. PATENTED JULY 9, 1907.
H. P. TRUEMAN & E. D. CLEGHORN.
MULTIPLE SPINDLE SCREW MAKING AND METAL TURNING LATHE.
APPLICATION FILED JULY 5, 1904.

7 SHEETS—SHEET 6.

No. 859,351. PATENTED JULY 9, 1907.
H. P. TRUEMAN & E. D. CLEGHORN.
MULTIPLE SPINDLE SCREW MAKING AND METAL TURNING LATHE.
APPLICATION FILED JULY 5, 1904.

7 SHEETS—SHEET 7.

UNITED STATES PATENT OFFICE.

HENRY PATTMAN TRUEMAN, OF HYDE, AND EDWARD DUNCAN CLEGHORN, OF MANCHESTER, ENGLAND, ASSIGNORS, BY DIRECT AND MESNE ASSIGNMENTS, OF ONE-THIRD TO SAID CLEGHORN, ONE-THIRD TO HARRY JACOB SMITH, OF CHARLTON CUM-HARDY, MANCHESTER, ENGLAND, AND ONE-THIRD TO CHARLES GEORGE SMITH, OF KEMBLE, CIRENCESTER, ENGLAND.

MULTIPLE-SPINDLE SCREW-MAKING AND METAL-TURNING LATHE.

No. 859,351.     Specification of Letters Patent.     Patented July 9, 1907.

Application filed July 5, 1904. Serial No. 215,352.

*To all whom it may concern:*

Be it known that we, HENRY PATTMAN TRUEMAN and EDWARD DUNCAN CLEGHORN, subjects of the King of Great Britain, residing, respectively, at Hyde, in the county of Chester, and Manchester, in the county of Lancaster, both in the Kingdom of Great Britain, have invented new and useful Improvements in the Construction of Multiple-Spindle Screw-Making and Metal-Turning Lathes, of which the following is a specification.

This invention relates to that class of screw making and metal turning lathes which are characterized—1st. By a plurality of work carrying spindles. 2nd. By a plurality of cutting tools, arranged to operate simultaneously upon the work carried by each spindle. 3rd. By the work carrying spindles and cutting tools being revolved by an upper revolving shaft. 4th. By the feeding of the material and the reciprocation of cutters to and from the work being effected by cam drums fixed upon a lower revolving shaft. 5th. By the work spindles being moved through a determined arc at each complete revolution of the cam drums on the lower shaft.

The object of our present invention is to so construct such lathes that the operator is enabled to adapt the machine to produce a wider variety of work than heretofore.

Briefly stated our improved multiple spindle screw-making and metal turning lathe embraces co-operating instrumentalities, which are so constructed and arranged in relation to each other and so timed in their movements as to give the operator increased facilities for setting the machine to produce a wide variety of work, without the necessity of making special cams and without removing or re-fixing wheels. The said co-operative instrumentalities may be numerated as follows:—

A work spindle carrier or turret, hereinafter called "turret", characterized by being mounted to revolve on a horizontal axis, carrying a plurality of work carrying spindles and having a locking bolt to retain it in a determined position, a series of bolts in the turret, adapted to engage with a key-way in a rotating worm wheel on the turret, means for withdrawing the said locking bolt; means for engaging the turret bolts with the rotating worm wheel; means for with-drawing the turret bolts at a predetermined arc of movement and means for again locking the turret in working position; a worm or gear meshing into suitable teeth formed on the rotating worm wheel, said worm or gear also meshing into a second rotating tooth gear, and which second gear is fixed or keyed to a shaft, carried in bearings; a plain disk or wheel without teeth, fixed upon the said shaft, which disk is capable of being inclined to any given angle, in a plane at right angles to its plane of rotation. A pair of rollers or jaw fixed to a member carried by the tool slide or carrier, adapted to engage with the rim of the inclinable disk, so as to impart a varying length of travel to the tool slide corresponding with the angle of inclination. A sliding member supported by the tool slide carrying the said rollers or jaw and also engaging a hand wheel and gearing, by means of which the said tool slide can be advanced and retreated, without revolving the inclinable disk. A belt driven pulley, directly geared to the worm or gear which rotates the turret, and the inclinable disk shaft, said belt being adapted to turn the shaft at the highest speed when the tools carried by the slide are not operating upon the work. A second belt driven pulley adapted to drive the gears at a speed to suit the character of the material operated upon, said belt driven pulleys being connected by trip gear in such a manner, that a cam or cams fixed on the lower shaft, will operate levers so as to disengage the one pulley, and at the same time engage the other. A sliding clutch upon the revolving work spindles with means for stopping any spindle at will.

The frame work of the machine may be of any convenient construction, and the apparatus for feeding the material and carrying the cutting tools is or may be similar to those described in British Letters Patent granted to the applicants, dated May, 31st. 1902, No. 12323, but as these devices do not form part of this present invention, they are not fully described herein.

We attain these objects by the mechanism illustrated in the accompanying seven sheets of drawings, in which—

Figure 3:
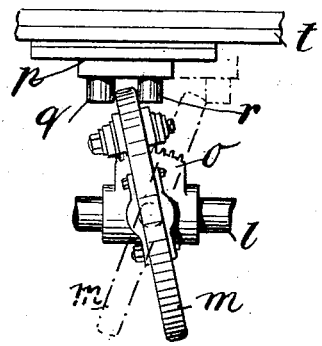
Figure 2:
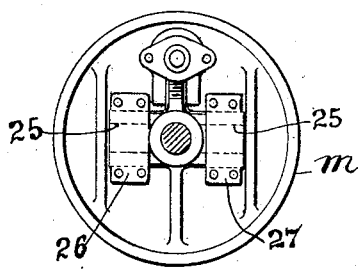
Figure 13:
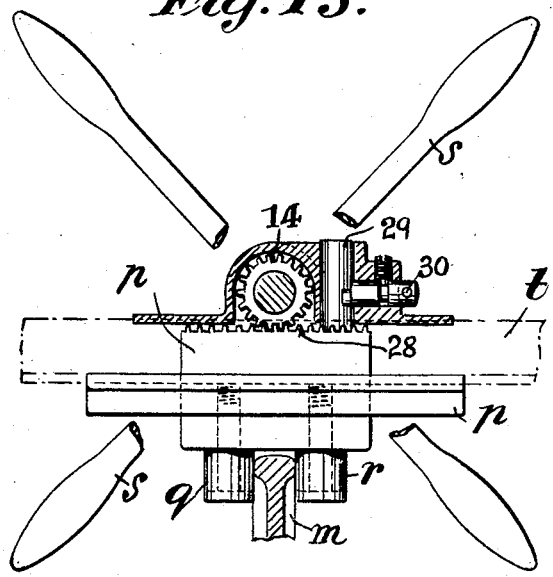

Figure 1 is an elevation thereof showing the various instrumentalities constituting our invention in their proper relation to each other. Fig. 2 is a side elevation, Fig. 3 a front view, and Fig. 4 a cross section of the inclinable disk, in Fig. 3 shown set to an angle giving a movement as shown in dotted lines and in Figs. 2 & 4 set to a right angle. Fig. 5 is a side elevation partly in section of the mechanism for moving the turret through a predetermined arc. Fig. 6 is an end elevation of the turret shown in its locked position. Fig. 7 is an elevation enlarged showing one of the bolts for moving the turret. Fig. 8 is a plan enlarged of a part of the moving gear and part of the cam strip for withdrawing the bolt. Fig. 9 is an elevation partly in section of the mechanism for stopping the rotation of any desired work spindle at will. Fig. 10 is an end view of Fig. 9. Fig. 11 is an enlarged view of spring bolt *e* for stopping the revolution of the work spindle 2. Fig. 12 is an elevation partly in section of the high and low speed gearing. Fig. 13 is a front elevation, and Fig. 14 a plan of the mechanism for enabling the tool slide of an abutment machine to be worked by hand. Fig. 15 is a cross section of Fig. 5 through the turret casing part which surrounds the turret worm wheel and through the turret itself in front of the gap ring.

Similar letters refer to similar parts throughout the several views.

In carrying out our invention and referring to Fig. 1, the turret *a* is supported in the casing *b*.

*c* is the locking bolt for retaining the turret in position during the operation of the cutting tools, and *d* the worm wheel on the turret. *e* is one of the bolts for engaging the turret with the said worm wheel at predetermined intervals.

*f* is an interrupted ring with a wedge end or ends and forms the device for withdrawing the bolt *e* when the turret has moved through its arc of revolution.

*g* & *h* are the cams employed for withdrawing and replacing lock bolt *c* at proper intervals.

*i* is the worm meshing with the worm wheel *d* and also with the second worm wheel *k*, Figs. 1 & 12, fixed upon shaft *l*.

*m* is the disk which is capable of being adjusted at various angles, *n* is the worm and *o* the worm sector for adjusting the disk *m*.

*p* is the sliding member and *q*, *r* are the jaw rollers attached thereto.

*s* is the hand wheel and gear carried by the tool slide body *t*. On turning the hand wheel the gear causes the body *t* to move longitudinally with respect to the sliding member *p* which is retained in position by the jaws *q*, *r* being engaged with disk *m*.

*u* is the belt driven pulley which is or may be directly geared to worm *i* for driving the shaft *l* and disk *m* at the highest rate of speed.

*v* is the belt driven pulley which is or may be connected to worm *i* by a train of wheels arranged to drive the shaft *l* and disk *m* at a speed suitable for the tooling of the work.

*w* is the main trip hammer, *x*, *y* are the cams on shaft *l* for operating the same, 42 is the supplementary trip lever which serves to hold the working clutch in gear until the main trip hammer strikes the other clutch into operation.

2 is the work carrying spindle, supported so as to revolve freely in turret *a*. This spindle has feathered to it, the sleeve of the clutch 3.

4 is a spur pinion on work spindle driven continuously by a gear 5, revolved by the upper or power driven shaft 6, see dotted lines.

3, 7, 8, 9, 10 & 11, Figs. 9, 10 & 11, are the means employed for stopping the revolution of the work spindle when required.

The operation of the parts as a whole are as follows:—
The work spindles 2 are revolved by shaft 6. Power being applied by a belt 12 and pulley *u* causes worm *i* to rotate gears *d* & *k*. Disk *n* being keyed to shaft *l*, partakes of this rotating motion. The tool carrying slide is rapidly moved forward by the jaws *q*, *r*, which are engaged with the edge of the inclined disk *m*. When the tools carried by the slide *t* are nearly touching the ends of the revolving material carried by 2 the cam *y* operates trip hammer *w* and the trip lever 42 which brings into operation the slower moving belt 13 and pulley *v*. The tools in the slide now advance at a determined cutting speed, until the end of inward stroke of the slide. The cam *x* then moves the trip hammer *w* which operates the trip lever 42 so as to engage belt pulley *u*. The slide then retreats rapidly. When the tools are clear of the work the lock bolt *c* is withdrawn by means of the cam *g*, *h*. One of the turret bolts *e* now engages with the worm wheel *d* and carries the turret through a determined arc of revolution. Thus presenting the work carried by the spindles 2 to the operation of the next tool carried by the slide *t*. The turret bolt *e* is withdrawn from worm wheel *d* by the interrupted ring *f* and the bolt *c* again locks the turret. During the arc movement of the turret the tool slide *t* has rapidly retreated to the end of the out stroke and has rapidly approached the work spindles, until trip hammer *w* again engages the gears connected to the slower belt 13 and pulley *v*. The cycle of operations is now complete and may be repeated automatically until the machine has exhausted its supply of material. When the work to be produced requires a longer or shorter stroke of the slide *t*, the adjustment can be effected by operating worm *n* so as to alter the inclination of disk *m* and also by adjusting the hand wheel gear 14. When it is required to stop one of the work spindles 2 the clutch 3, shown more clearly in Figs. 9, 10, is moved endwise out of gear with the clutch on the spur pinion 4 rotating continuously upon the spindle 2 by means of cam projection 7 which projection is moved by the spring bolt 8 carried by the ring 9. The movement of the ring 9 is obtained by the action of the cam 10 through the rack rod 11. The sliding member *p* and hand wheel *s* enable the operator to withdraw the tools from the work without revolving the shaft *l*.

The entire organization herein described depends on the co-operation of all the parts as a whole to produce the new and useful result of increased facility of operation and cheapening of the products.

None of the parts herein described as forming this invention could be omitted without impairing the useful result.

In order that this invention may be readily carried into effect by any person skilled in the art of making automatic screw making machines or lathes, we will describe more fully the construction of the operating mechanism in detail.

Figs. 5, 6, 7 & 8 show the means used to lock the turret and also the means for moving the turret through a determined arc. The lock bolt *c* is held normally in the turret socket 15 by the springs 16, 17. The cams *g* & *h* on shaft *l* are timed so that at the proper moment they withdraw the lock bolt *c* to allow of the turning of the turret. The springs 16 & 17 return the lock bolt *c* into socket 15.

The details of the bolt mechanism used to move the turret through a determined arc, are shown clearly in Fig. 5; in this case the arc of movement is required to be 90 degrees, consequently four bolts are employed, two of which are shown in Fig. 5. *a* is the turret in section and 18 indicates the slots or grooves for the reception of the bolts *e*. The bolts *e* are pressed towards the worm wheel *d* by means of springs 19 acting on abutment 20 shown clearly in enlarged view of the bolt *e* in Fig. 7. A key-way 21 in the worm wheel $d$ is shown by the dotted lines Fig. 8. Three of the bolts $e$ are always held out of contact with the worm wheel $d$ by means of the interrupted ring $f$ which has a gap of about 90 degrees and is secured to the interior of the turret casing $b$ while one of the bolts $e$ is in engagement with the key-way 21 of which latter there is only one in the worm wheel $d$ and turns the turret until it arrives at the opposite side of the interruption when its projections 22 and 23 enter upon the wedge formed end 1 of the interrupted ring $f$ and it is thus withdrawn from the slot 21 leaving the turret $a$ at rest, while the worm wheel continues its rotation. As the worm wheel $d$ completes one revolution, the next bolt $e$ which enters in the gap $f$ as the other leaves it arrives opposite to and by its spring 19 is then pressed into the key-way 21 of the worm wheel $d$ thereby engaging and imparting another quarter of a revolution to the turret.

Figure 4:
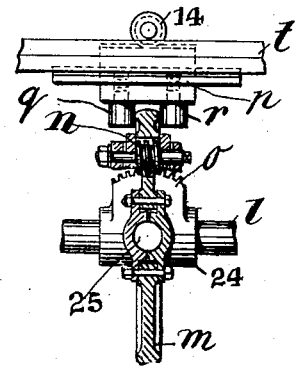

The details of the inclinable disk $m$ are shown in Figs. 2, 3 & 4. The boss 24 is firmly fixed upon the shaft $l$ so as to rotate with the same; boss 24 has trunnions 25 at right angles to the shaft $l$. Boss 24 is also provided with a toothed sector $o$ adapted to engage with a worm $n$. The disk $m$ is clamped upon the trunnions 25 by bearing caps 26 & 27 and is shown in a vertical position in Figs. 2 & 4, in which case its rotation would produce no longitudinal movement of the jaws $q, r$ and tool slide $t$ connected therewith.

By turning the worm $n$, the disk may be inclined as shown in Fig. 3, in which case the longitudinal movement of $q$ & $r$ would be double the angle of inclination as is well understood.

Figure 14:
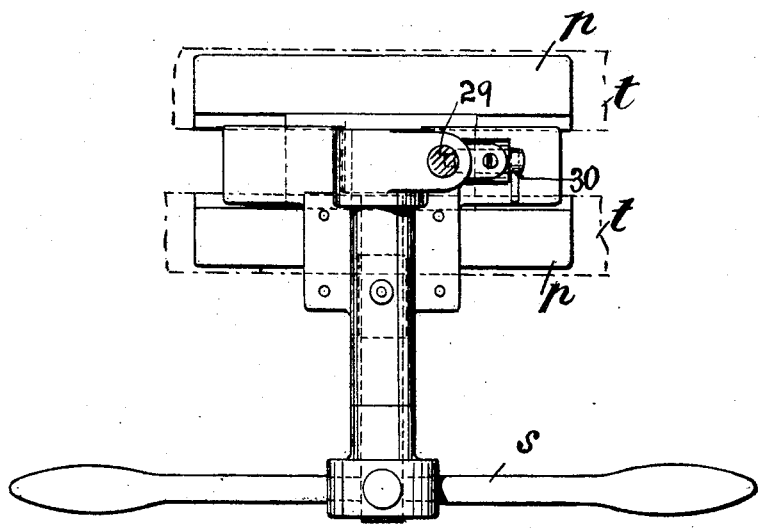
Figure 15:
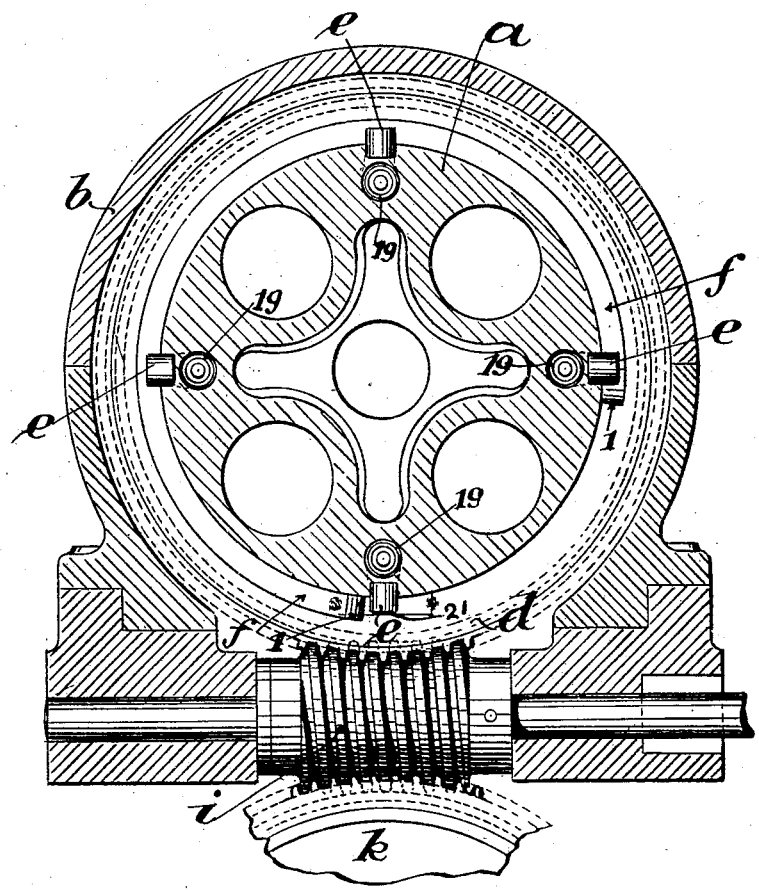

Figs. 13 & 14 show the hand wheel gear to enable tool slide $t$ to be operated by hand. $p$ indicates the sliding member which is fitted in a cavity of the tool slide $t$ allowing $p$ to move longitudinally with respect to $t$. The jaws $q, r$ are fixed to the underside of $p$. The upper side of $p$ is formed as a rack, with teeth 28 adapted to engage with toothed pinion 14, said pinion 14 is carried in bearings fixed to slide $t$. When the pinion is revolved the tool slide $t$ moves longitudinally over the slide piece $p$. 29 shows a stop plug carried in a bearing fixed to slide $t$. 29 can be moved vertically by means of lever 30 so as to be engaged with or free from the rack 28. When 29 is engaged with the rack, the slide partakes of the motion communicated to jaws $q, r$. When 29 is lifted free of the rack, the sliding piece $p$ is held by the edge of disk $m$ but the tool slide $t$ can be moved longitudinally by turning the pinion 14.

Fig. 12 shows the high and low speed driving gear with details of the trip mechanism. The belt driven pulley $u$ is geared to drive $i$ which in turn drives gear $k$, on shaft $l$ at the highest speed required. The cam $y$ is timed to lift 31 so that the roller 32 passes the edge of bolt 33. Bolt 33 is pressed upwards by spring 34. The pressure of spring 34 causes bolt 33 to throw trip hammer $w$ and its attached weight 35 sharply against collar 36 fixed to rod 37. Rod 37 is connected by a pin 38 passing through a slot 39 in the wall of hollow shaft 40 to cone clutch 41 feathered upon the said shaft 40. Cone clutch 41 is thus moved endwise out of contact with pulley $u$. A collar on cone clutch 41 engages with one end of a lever 42 pivoted at 43; the other end of lever 42 engages with collars 44, 45 on rod 46 which latter is connected by pin 47 moving through slot 48 in the wall of hollow shaft 49 to cone clutch 50, which latter is then moved into contact with pulley $v$. Cone clutch 50 is feathered on hollow spindle 49. On 49 is feathered a pinion 51 which gears into another pinion 52, keyed on hollow spindle 40. Cone clutch 41 is feathered so as to revolve with the hollow shaft 40 but is capable of being moved endwise thereon. The belt driven pulley $v$ is carried by a sleeve mounted in a bearing on the framework and the belt pulley $u$ is fixed to a part of the framing shown at 54.

The trip lever 42 is furnished with the trip finger $z$ which is pressed outwards by spring 55. The object of this supplementary trip lever is to hold the acting clutch in contact while the primary trip hammer $w$ is moving across the point of bolt 33.

The means for stopping a work spindle when desired is shown detailed in Figs. 9 & 10. 2 is the work spindle which is driven by gear wheel 4. Gear wheel 4 is driven by toothed pinion 5 which is rotated by a power driven shaft 6. The clutch sleeve 3 is feathered to work spindle 2 and is normally pressed against gear 4. When so pressed, gear teeth 56 & 57 are in contact. The clutch teeth 57 are moved out of contact with the clutch teeth 56 by means of the cam projection 7. The latter is part of the bush extension 58 which is gartered to the clutch 3 and is supported in a recess concentric with spindle 2. In the body of the bush extension 58 is formed a cam slot 59. In the turret $a$ is fixed the pin 60 which enters the cam slot 59 of the said bush, so that if the bush extension 58 is turned round by 7 the bush itself moves endwise thus moving the clutch teeth 57 from contact with 56 and engaging clutch teeth 61 with teeth 62. The bush extension is normally pressed in the direction of teeth 56 by a spring or springs shown at 63. The method of moving the cam projection 7 is shown clearly in Figs. 9 & 10. The ring 9 is supported by the turret casing $b$. 64 are gear teeth fixed to or formed on ring 9.

A rod 11 having rack teeth to engage with teeth 64 is supported in bearings and end movement is communicated to the rod at the proper time by cam 10 fixed on shaft $l$. A spring bolt 8, shown enlarged in Fig. 11, is fixed in the ring 9, this bolt 8 has one edge formed as a wedge shown at 65 so that the cam projection 7 can start from position shown by dotted lines 66 and pass on to the position shown at 7. The cam projection engages with the wedge side 65 which is then pressed inwards allowing cam projection 7 to pass in front of bolt 8. Bolt 8 is then pressed outwards by springs 67 so as to be in a position to engage cam projection 7. When cam 10 moves rod 11, the rings 9 and bolt 8 move towards cam projection 7, thus causing the bush extension 58 to move endwise and remove the clutch teeth 57 from contact with 56 as herein-before described. Rod 11 is pressed against cam 10 by a spring 68 as shown, thus returning the ring 9 to its normal position.

This description of the parts and mode of operation, taken in connection with the accompanying drawings will be readily understood by persons accustomed to making or using this class of screw machines or lathes.

We lay claim to no broad principles but confine ourselves to the devices combined and arranged as and for the purpose herein described.

What we do claim as our invention, and desire to secure by Letters Patent, is—

1. In a lathe of the character described, a stationary casing, a rotatable work turret therein, a worm wheel loose around the said turret, a worm in gear with the said worm wheel, means for continuously rotating the said worm and automatic means in the interior of the said casing and the periphery of the said turret comprising respectively a gap ring and spring controlled bolts engaging with the gap ring in connection with means in the side of the said worm wheel for alternatively positively locking the said worm wheel to and releasing it from the said turret to impart an intermittent rotary movement thereto, all substantially as and for the purpose set forth.

2. In a lathe of the character described, a stationary casing, a work turret rotatable therein, a worm wheel loose around the said turret and having a key way, means for continuously rotating the said worm wheel and means for alternately locking it to and relieving it from the said turret casing, comprising spring bolts located in the periphery of the said turret to engage successively in the said key way and thereby lock the said wheel to the turret to move it through a determined arc and a gap ring secured to the interior of said turret for drawing the bolt out of the said key way at the completion of the said arc, all substantially as and for the purpose specified.

3. In a lathe of the character described, a reciprocating tool carrier, means for operating said tool carrier comprising a rotating shaft, a rigidly held cam disk on said shaft having its periphery in operative engagement with said tool carrier, and means for inclining said disk to any desired extent, substantially as described.

4. In a lathe of the character described, a reciprocating tool carrier, means for operating said tool carrier comprising a rotating shaft, a gear segment carried by said shaft, a cam disk also carried by the shaft, and having its periphery in operative engagement with said tool carrier, and a worm rotatable in said disk and meshing with said gear segment, substantially as described.

5. In a lathe of the character described, a bed, a reciprocating tool carrier upon the said bed, a manually rotated shaft mounted on the base of the said tool carrier, a spur pinion secured upon the said shaft, a slide against the bottom of the said bed, a rack on and moving with the said slide with which the said pinion gears, automatic means for reciprocating the said slide and rack and means for locking the said pinion and tool carrier to and unlocking the same from the latter, comprising a plug in the base of the said tool carrier and a lever in operative engagement therewith to raise and lower it out of and into the said rack respectively, all combined substantially as and for the purpose set forth.

6. In a lathe of the character described, a rotatable work turret, a worm wheel thereon, a reciprocating tool carrier, a shaft below the same, a worm wheel and a cam disk thereon for operating the said tool carrier, a worm in gear with the said worm wheels for rotating them, two main driving shafts, means for imparting rotary motion from one of the said main shafts to the said worm, a loose clutch driving pulley on each of the said main shafts, speed changing wheels between the said two main shafts for varying the ratio thereof and automatic means for alternately engaging and disengaging the said pulleys with their shafts and thereby vary the speed of the said tool carrier, all substantially as and for the purpose set forth.

In witness whereof we have hereunto set our hands in presence of two witnesses.

HENRY PATTMAN TRUEMAN.
EDWARD DUNCAN CLEGHORN.

Witnesses:
ALFRED BOSSHARDT,
STANLEY E. BRAINALL.